United States Patent

[11] 3,607,843

| [72] | Inventor | Fernando C. Vidaurri, Jr. |
| | | Bartlesville, Okla. |
| [21] | Appl. No. | 825,448 |
| [22] | Filed | May 16, 1969 |
| [45] | Patented | Sept. 21, 1971 |
| [73] | Assignee | Phillips Petroleum Company |

[54] PROCESS FOR MAKING POLY (PHENYLENE SULFIDE) POLYMERS OF INCREASED MOLECULAR WEIGHT
5 Claims, No Drawings

[52] U.S. Cl. .................................................. 260/79 R, 260/78 R, 260/79.1 R
[51] Int. Cl. ....................................................... C08g 23/00
[50] Field of Search .......................................... 260/79, 79.1

[56] References Cited
UNITED STATES PATENTS

| 2,538,941 | 1/1951 | Macallum | 260/79 |
| 3,395,132 | 7/1968 | Smith | 260/79.5 |
| 3,407,182 | 10/1968 | Hinton | 260/79 |
| 3,457,242 | 7/1969 | Hill, Jr. | 260/79 |
| 3,478,000 | 11/1969 | Saunders et al. | 260/79.1 |
| 3,354,129 | 11/1967 | Edmonds, Jr. et al. | 260/79 |

Primary Examiner—Donald E. Czaja
Assistant Examiner—M. I. Marquis
Attorney—Young and Quigg

ABSTRACT: The inherent viscosity of poly(phenylene sulfide) polymers is substantially increased and the range narrowed by recycling to the reactor as one of the reaction ingredients previously produced poly(phenylene sulfide) polymer.

PROCESS FOR MAKING POLY (PHENYLENE SULFIDE) POLYMERS OF INCREASED MOLECULAR WEIGHT

This invention relates to a method for the production of poly(phenylene sulfide) polymers. In another aspect, it relates to a method of increasing the inherent viscosity of poly(phenylene sulfide) polymers.

Heretofore, poly(phenylene sulfide) polymers have been prepared in batch reactors using various reactants under polymerization conditions. The resultant poly(phenylene sulfide) polymers generally have had somewhat lower molecular weights, as represented by their inherent viscosity values, than desirable for some applications.

Poly(phenylene sulfide) polymers in general are thermoplastic and are valuable for various commercial applications. Such polymers can be molded rapidly and efficiently into almost any desired shape and easily lend themselves to mass production. These polymers, when of suitably high molecular weights, can withstand high temperatures and so are useful in high temperature insulation and the like.

For many applications, it is desirable to produce polymers with a narrower range of molecular weight than has heretofore been possible. The previously produced polymers have contained some high molecular weight, some moderate molecular weight, some low molecular weight material, and the range of molecular weights has been exceedingly wide. A product of higher molecular weight and of narrower molecular weight range would be particularly advantageous for fiber usages.

According to my invention, poly(phenylene sulfide) polymers of higher molecular weights as reflected by higher inherent viscosity values can be directly produced in batch type operations. These polymers are obtained by recycling a quantity of previously formed polymer to the reactor as an ingredient for a succeeding batch. The product ultimately produced has a higher average inherent viscosity and hence higher molecular weight, and also has a narrower molecular weight distribution, a product particularly suitable for many commercial applications.

It is, therefore, an object of my invention to prepare poly(phenylene sulfide) polymers of increased inherent viscosity. It is a further object of this invention to produce poly(phenylene sulfide) polymers of narrowed molecular weight distribution.

Other aspects and objects of my invention together with the several advantages of my invention will be apparent to those skilled in the art to which it most nearly pertains from the description given herein together with the appended claims.

Poly(phenylene sulfide) polymers can be prepared by methods known to the art such as that as set forth in U. S. Pat. No. 3,354,129, James T. Edmonds, Jr., et al., issued Nov. 21, 1967.

In addition to the reactants necessary for the formation of poly(phenylene sulfide), I use an added component in the polymerization zone, an added reactant, specifically a portion of lower inherent viscosity poly(phenylene sulfide) previously prepared by a previous polymerization. The recycle lower inherent viscosity poly(phenylene sulfide) becomes, by my invention, an important reactant in each subsequent batch preparation.

I use in my disclosure the terms inherent viscosity and molecular weight as having herein essentially the same meaning. Determination of molecular weight is difficult and often leads to variable data depending on the method chosen. However, it is generally recognized that the inherent viscosity value of a polymer is a good reflection of its molecular weight, and that an increase in inherent viscosity reflects a distinct increase in the molecular weight of the polymer, and vice versa. Numerical relationships between inherent viscosities and molecular weights are available for some polymers, but not, as yet, for the poly(phenylene sulfide) polymers.

It is probable that the rate of reaction of monomers with the recycle poly(phenylene sulfide) polymers is greater than that of the monomers with monomers. By including in the reaction admixture a portion of previously formed polymer, there is produced a polymer product of higher inherent viscosity than is possible under identical conditions but without the recycle material. This probably is due to the presence initially of lower molecular weight poly(phenylene sulfide) available to react with the monomers, as well as the monomers interreacting to produce additional polymer. Further, since polymer with a higher reaction rate is present initially, i.e., the recycle material, for an overall fixed reaction time, the reaction can be carried out at lower temperatures. Lower temperatures tend to favor the formation of polymers of higher inherent viscosity.

While a portion of the prior batch can be recycled as is, it is a preferred method of my invention to separate lower molecular material from the total product by appropriate means such as solvent extraction. This cut, or fraction, of lower molecular weight material is then used as the recycle polymer as a reactant in a succeeding batch. The material remaining after such a separation process has a relatively narrow molecular weight range.

The material for recycle is typically solvent extracted from the total batch material. This extraction can be by means of solvents such as N-methyl-2-pyrrolidone (NMP) using an extraction temperature of about 275 to 300° F.; or benzene at a temperature of about 175° to 300° F.; or toluene at a temperature of about 230° to 300° F.; and the like.

The extracted material can be split into two fractions, or even into several fractions, if desired. In such a method, the extremely low inherent viscosity material can be discarded or otherwise used, while the moderate range material can be used as recycle polymer for succeeding batches of material. The total lower inherent viscosity material can be extracted in a solvent at a higher temperature, and then the moderate range material precipitated or separated by means known to the art, such as cooling of the polymer solvent solution which then will precipitate out the moderate range weight material, leaving the very low range material soluble in the cold or cool solvent.

While other methods of producing poly(phenylene sulfide) may be used with my invention, the method described in the hereinbefore referenced U.S. Pat. No. 3,354,129 is particularly useful. This method includes reacting at least one polyhalo-substituted cyclic compound containing unsaturation between adjacent ring atoms and wherein the halogen atoms are attached to ring carbon atoms with an alkali metal sulfide in a polar organic compound at an elevated temperature. Generally the polar organic compound selected will substantially disperse both the alkali metal sulfide and the polyhalo-substituted aromatic compound, or other compound which may be present as will appear hereinafter.

The polyhalo-substituted compounds which can be employed as primary reactants in this method of preparation of polyphenyl sulfide polymers are represented by formulas given in detail in the aforementioned Edmonds et al. patent.

The compounds of the general formulas given in the Edmonds et al. patent which are preferred are those which contain not more than three halogen atoms, and particularly preferred are the dihalo-substituted compounds.

The alkali metal sulfides which can be employed in the process are represented by the formula $M_2S$ wherein M is a metal as defined above, and includes the monosulfides of sodium, potassium, lithium, rubidium and cesium, including both anhydrous and hydrated forms. The preferred sulfide reactant is sodium sulfide and its hydrates.

The polar organic compounds employed as reaction media and solvent include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides and the like.

Specific examples of the polyhalo-substituted compounds are 1,4-dichlorobenzene (DCB), 1,4-diiodobenzene, 1,4-difluorobenzene, 2,5dibromoaniline, 1,2,4,5-tetrabromobenzene, methyl 2,5-dichlorobenzoate, 2,5-dichlorobenzamide, ethyl 2,4,5-trichloroacetanilide, 1- cyclohexylthio-2,5-dichlorobenzene, 3,4-dichlorofuran, 3,4-difluoropyrrole, 2,5-dichloropyridine, 4,8-diiodoquinoline, p,p'dichlorodiphenyl ether, 3,3'-dichlorodiphenyl dimethylsilane, di(2-methyl-4-bromophenyl) sulfoxide, methyl di(3-ethyl-4-chlorophenyl) phosphite, 4-bromophenyl 3-n-butyl-4-chlorophenyl sulfone, 2,6-dichloropyrazine, and others as disclosed in U.S. Pat. No. 3,354,129 referenced hereinbefore.

The process of preparing poly(phenylene sulfide) polymers is carried out by contacting reactants selected from the types previously described in a polar solvent at a temperature of from about 125° to about 550° C., preferably from 300° to 500° C. The mole ratio of polyhalo-substituted aromatic or heterocyclic compounds to $M_2S$ reactants should be at least 0.1:1 and will generally not exceed 2.0:1. The amount of polar organic solvent present in the reaction zone can vary over a wide range from about 100 to 2,500 ml. per mole of alkali metal sulfide.

By my invention, each batch of poly(phenylene sulfide) can be treated by a separation process, such as by solvent extraction as hereinbefore described, to separate lower range inherent viscosity product from that of higher range. The higher range material is the product desired. The lower range material is used as the recycle component of succeeding batches along with the monomers and solvent as I have described.

I can recycle sufficient poly(phenylene sulfide) to a succeeding batch such that the recycle material constitutes up to about 50 weight percent of the total of reactants present, i.e., the total of recycle material plus monomers. If I use more recycle material than this, then the result is low reactivity in the batch, slow reactions. Slow reactions require undue time and so become more costly. I can compensate for the low reactivity by increasing or raising the reaction temperature to a higher area to speed the reaction along. However, too high a temperature results in polymer degradation which is undesired. And, as I have stated hereinbefore, it is desirable to operate at reduced temperatures since such tend to favor the formation of poly(phenylene sulfide) polymers of higher inherent viscosity which are preferred.

As to the minimum amount of recycle material to use as a reactant in a batch, about 3 weight percent, as defined above, is the lower amount which I find shows results in the batch in which it is used.

The preferred effective range is from about 5 weight percent to about 33 weight percent.

By proper selection of the polyhalo-substituted aromatic reactants, one can modify the polymers and obtain polymers of varying crystallinity. For example, a highly crystalline poly(phenylene sulfide) can be prepared by reaction of p-dichlorobenzene and sodium sulfide in a polar solvent such as N-methyl-2-pyrrolidone. By utilizing a mixture of p-dichlorobenzene and 1,2,4-trichlorobenzene, the degree of cross-linking of the polymer can be increased. On the other hand, when a mixture of p-dichlorobenzene and dichlorotoluene is used, the crystallinity of the polymer is reduced, thus changing the melting point and shear viscosity of the polymers.

One can employ polyhalo-substituted aromatic compounds which contain other substituents through which cross-linking can be effected by further reaction. For example, reaction of sodium sulfide with a mixture of p-dichlorobenzene and 2,5-dichloroaniline yields a poly(phenylene sulfide) containing amino groups on some of the aromatic nuclei, the extent depending on the amount of dichloroanilne employed. Such a polymer can be cross-linked by use of a dicarboxylic acid, thus forming polyamide-type cross-links.

EXAMPLE

Two parallel runs were made, with all conditions identical except that the second run was by the process of this invention whereby an amount of low molecular weight polymer was used as a reaction ingredient in addition to the standard reactants.

Both runs were made under the following reaction conditions:

| Reaction Temperature | 475° F. |
|---|---|
| Reaction Time | 300 mins. |
| Conc. of Dichlorobenzene, mol/mol NMP | 0.067 |
| Conc. of $Na_2S$, mol/mol NMP | 0.066* |
| | |
| DCB reacted, Weight Per Cent | 92.8 |
| Grams | 279 |
| Poly(phenylene sulfide), Recovered Grams | 193 * |

*$Na_2S \cdot 9H_2O$ was charged to the reactor and the $H_2O$ removed by fractionation.

In run 1 the ingredients were as above. In run 2 additionally there was included in the reaction admixture 82 grams of 0.06 inherent viscosity polymer from run 1.

The product of run 1 had an inherent viscosity of approximately 0.06.

In run 2, the run by the process of my invention, the polymer produced had an inherent viscosity of 0.09. Thus, it will be seen that by the recycle of polymer according to the process of my invention that the inherent viscosity of the final poly(phenylene sulfide) was increased by about 50 percent in this experiment.

In order to be absolutely certain that the above increase in the inherent viscosity of the polymer was not attributable to simple variation in results despite the closeness of maintenance of process conditions, studies were made of the reproducibility of inherent viscosity from batch to batch in the pilot plant wherein the above runs were made. In these runs, no recycle polymer was utilized. All batches were made with 3 mol percent excess p-dichlorobenzene and 0.25 moles of sodium sulfide per mole of n-methyl-2-pyrrolidone (NMP). The reaction was induced by heating and the reaction temperature was allowed to come to 475° F. and was then maintained for four hours before dumping. Of six separate runs made under conditions as closely identical as possible, the inherent viscosity ranged only 0.17, 0.16, 0.17, 0.18, 0.18, 0.18, on succeeding batches. These examples show that runs under essentially the same reaction conditions result in the same product.

Therefore, the examples given demonstrate that the process of my invention in which lower inherent viscosity poly(phenylene sulfide) polymer is recycled to the reactor as one of the reaction ingredients produces a product with a distinctly higher inherent viscosity and hence is a higher molecular weight material.

Since there is no standard ASTM method for the determination of the inherent viscosity of poly(phenylene sulfide) polymers, I describe below the method used routinely on the samples described in my examples.

Weigh 0.15 to 0.20 grams of polymer into a tared 50 ml. volumetric sample flask and add about 40 ml. of chloronaphthalene solvent. Place the flask in a silicone oil bath maintained at 210° C. until all of the poly(phenylene sulfide) is in solution. Suspend a 100 ml. volumetric flask containing 60–70 ml. of chloronaphthalene in the oil bath and allow to come up to temperature. This latter flask and solvent are used as a blank to determine the solvent viscosity, to bring the sample flasks up to the mark, and for washing the viscometer.

When the sample of polymer is in solution, flush a 10 ml. pipette with small portions of hot solvent 3 or 4 times and fill the sample flask to the mark with hot solvent. Remove the sample flask, using gloves or towels and mix by inverting 2–3 times. Vent and mix cautiously and carefully. Replace in the oil bath for 10 minutes.

Flush a clean 10 ml. pipette with portions of the hot sample solution 3 or 4 times, avoiding use of solvent from the bottom of the flask since particles of insoluble matter sometimes appear. Transfer exactly 10 ml. of the sample solution to the viscometer in the vapor bath held at 206° C. ±0.2° C. After 10 minutes determine the viscosity making 2 or 3 runs on the time of flow and determining the mean.

CALCULATION:

Flow Time of Sample/Flow Time of Solvent = Relative Viscosity = $X$

Natural Logarith of $X = Y$

Concentration in grams/100 ml. = $Z$

Inherent Viscosity = $Y/Z$

The polymers produced by my invention have particular application where higher molecular weight and particularly narrower molecular weight range polymer would be most useful, such as in the preparation of various types of fibers where very closely controlled polymer composition is desirable for consistent commercial products. The polymers also are useful where it is desired to produce useful articles by molding techniques known to the art. Processing should be carried out above the melting point or softening point but below the decomposition point of the particular polymer being utilized. Any molding technique known to the art is suitable, and any fiber forming or spinning technique known to the art can be utilized with the polymers in this invention.

The polymers can be blended with fillers, pigments, stabilizers, softeners, extenders, and other polymers, by means known to the art.

Reasonable variations and modifications of this invention are possible within the scope of this disclosure without departing from the spirit thereof.

I claim:

1. A process for producing poly(phenylene sulfide) of increased inherent viscosity which comprises:
   a. polymerizing under polymerization conditions a polyhalogenated ring compound, an alkali metal sulfide, and from about 3 to 50 weight percent of previously produced lower inherent viscosity poly(phenylene sulfide), wherein said polymerization conditions include a reaction time of from about 200 to about 1,600 minutes, a temperature of from about 125° to about 550° F., a mole ratio of said polyhalogenated ring compound to said alkali metal sulfide of from about 0.1:1 to 2.0:1, and from about 100 to 2,500 ml. of a polar organic solvent per mole of said alkali metal sulfide wherein said polar organic solvent is a compound that will substantially disperse both said polyhalogenated compound and said alkali metal sulfide and is selected from the group consisting of amides, lactams, sulfones, and mixtures thereof, and thereby producing poly(phenylene sulfide),
   b. separating from the polymer product of said step (a) poly(phenylene sulfide) of lower inherent viscosity, 2. The process of claim 1 wherein said polyhalogenated compound is a dihalo-substituted ring compound wherein the halogen atoms thereof are selected from at least one of fluorine, chlorine, bromine, and iodine, and are attached to ring carbon atoms; and said alkali metal sulfide is a sulfide of lithium, sodium, potassium, or rubidium.

3. The process of claim 2 wherein said dihalo-substituted ring compound is selected from p-dichlorobenzene, 4,4'-dibromobiphenyl, 2,5-dibromothiophene, 4,4'-bis-p-bromophenyl ether, and 2,5-dichlorobenzene-sulfonic acid; and the said polar organic compound is selected from at least one of hexamethyl phosphoramide, tetramethylurea, N,N'-ethylene dipyrrolidone, N-methyl-2-pyrrolidone, pyrrolidone, caprolactam, N-ethylcaprolactam, sulfolane, dimethylacetamide, and mixtures thereof.

4. The process of claim 1 wherein in said step (a) said dihalo-substituted ring compound is p-dichlorobenzene, and said alkali metal sulfide is sodium sulfide, and each of which is employed at from about 0.05 to 0.5 mole per each mole of said polar organic compound, and wherein said polar organic compound is N-methyl-2-pyrrolidone.

5. The process of claim 3 wherein is used in step (a) from about 5 to about 33 weight percent of lower inherent viscosity recycle poly(phenylene sulfide).

UNITED STATES PATENT OFFICE

19396 LHC

CERTIFICATE OF CORRECTION

Patent No. 3,607,843                          Dated: September 21, 197

Fernando C. Vidaurri, Jr.

It is certified that error appears in the above-identified patent and that sa Letters Patent are hereby corrected as shown below:

Col. 6, lines 12 and following should include steps (c) and (d) as follows:

(c) recycling at least a portion of the said poly(phenylene sulfide) of lower inherent viscosity to the polymerization step (a), and (d) recovering the balance of the poly(phenylene sulfide) from said step (b) as a product with substantially increased inherent viscosity.

Signed and sealed this 25th day of April 1972.

(SEAL)
Attest:

EDWARD M. FLETCHER, JR.                    ROBERT GOTTSCHALK
Attesting Officer                              Commissioner of Patents